United States Patent [19]
Waful

[11] 3,750,152
[45] July 31, 1973

[54] PULSE-ECHO PHASE DISCRIMINATOR USING DELTIC PROCESSING

[75] Inventor: Lawrence F. Waful, Liverpool, N.Y.

[73] Assignee: General Electric Company, Syracuse, N.Y.

[22] Filed: Apr. 17, 1972

[21] Appl. No.: 244,802

[52] U.S. Cl.............. 340/3 R, 235/181, 324/83 A, 343/16 R, 343/100 CL
[51] Int. Cl............................................. G01s 9/66
[58] Field of Search.................... 343/16 R, 100 CL; 340/3 R, 6 R; 235/181; 324/83 A, 83 D

[56] References Cited
UNITED STATES PATENTS

| | | | |
|---|---|---|---|
| 2,958,039 | 10/1960 | Anderson | 340/6 R |
| 3,289,154 | 11/1966 | Cunningham | 235/181 |
| 3,373,359 | 3/1968 | Pryor et al. | 235/181 |
| 3,521,044 | 7/1970 | Costas | 343/100 CL |
| 3,591,789 | 7/1971 | Hoffman et al. | 235/181 |
| 3,646,334 | 2/1972 | Wold | 343/100 CL |
| 3,663,956 | 5/1972 | Purdy et al. | 324/83 D |

Primary Examiner—Richard A. Farley
Attorney—Carl W. Baker et al.

[57] ABSTRACT

This disclosure is of a pulse-echo signal processor for deriving and displaying bearing angle information by measurement of the phase difference of echo signals received at two spaced points. Bearing angle determination is accomplished by processing signals received at each of the two spaced points through a moving time series DELTIC and correlating the time-compressed outputs with the transmitted signal which is correspondingly time-compressed in a stationary time series DELTIC. The correlation signals thus generated are combined to provide an unthresholded display output, in which the input signal amplitude information is preserved, and a thresholded output to a timer which indicates the desired phase difference measurement.

5 Claims, 3 Drawing Figures

SHEET 2 OF 2
FIG.2
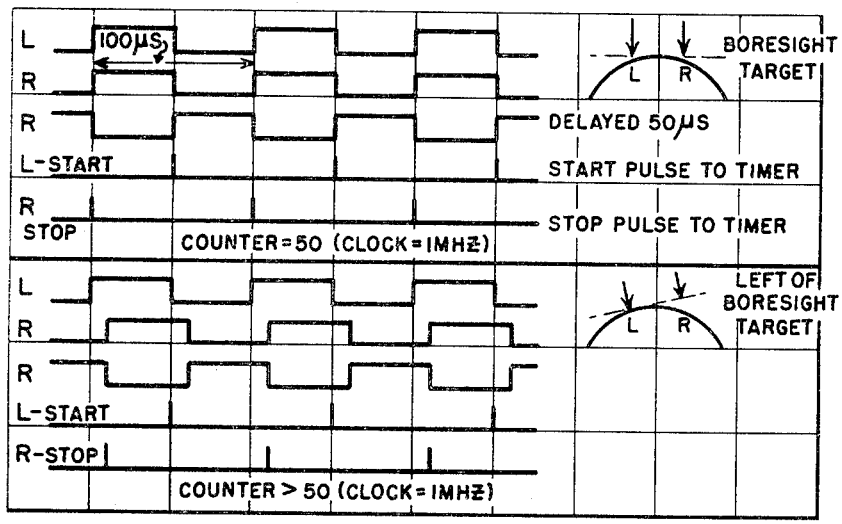
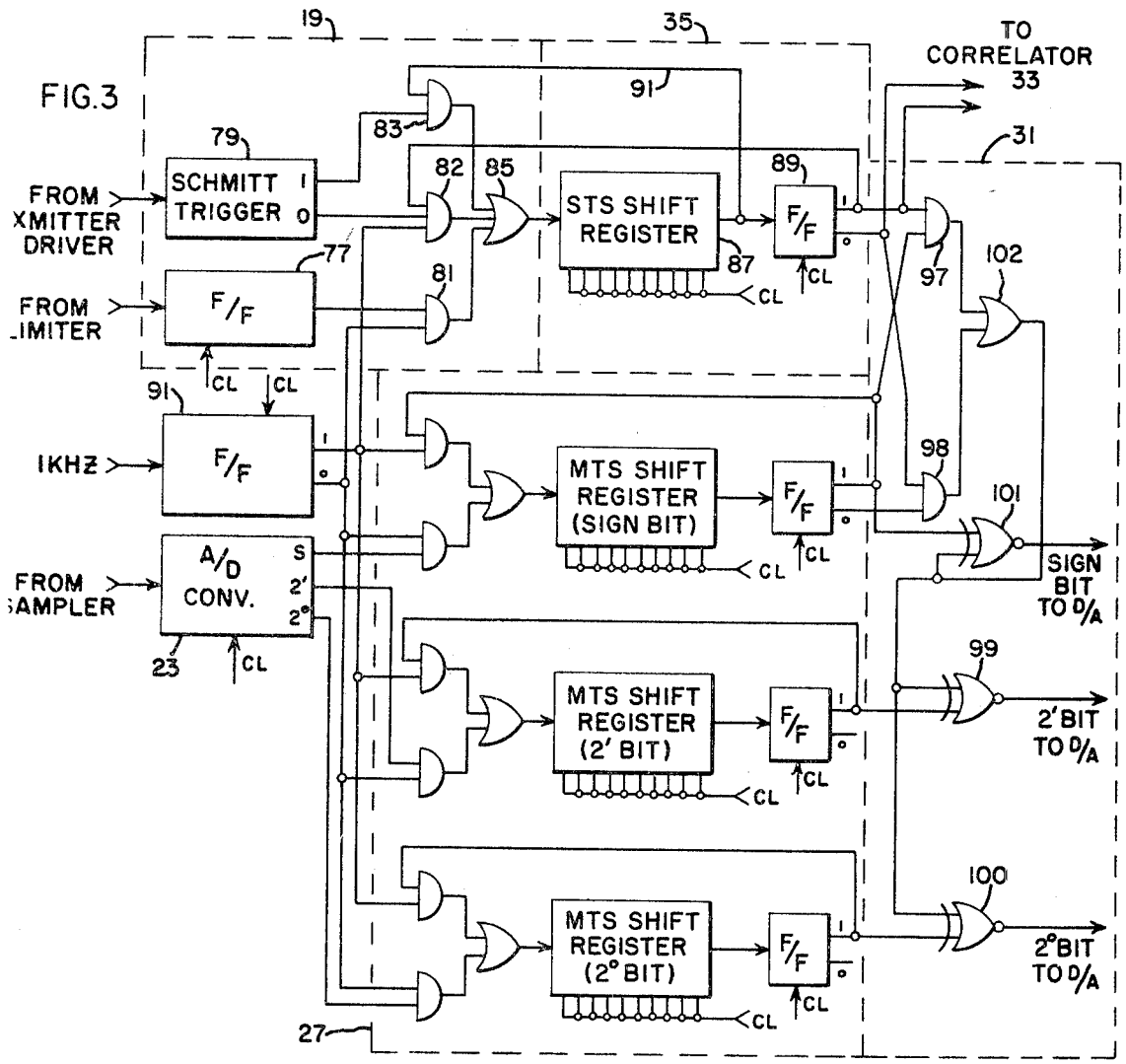
FIG.3

3,750,152

PULSE-ECHO PHASE DISCRIMINATOR USING DELTIC PROCESSING

BACKGROUND OF THE INVENTION

The invention herein described was made in the course of or under a contract or subcontract thereunder, with the United States Navy.

This invention relates generally to signal processors for sonar and other acoustic pulse-echo systems, and more particularly to phase discrimination processors capable of deriving from the phase relationships of echo signals received at two spaced points a measurement of the bearing angle to the location of the object from which those signals were reflected, and capable also of accomplishing this measurement with good reliability and accuracy even with signals of very low signal-to-noise ratio.

It is common practice in sonar, seismograph and other pulse-echo systems to determine the bearing angle to a target or other reflective object from which echo returns are received, by measuring the difference in phase of the reflected signals as received at two spaced points to thus arrive at a measure of the difference of travel time of reflections from the object. If the object lies squarely on boresight, i.e., if it lies on a line normal to the line joining the two points at which the receivers are located, the transit times of signals to the two receivers will be the same and the reflected signals will arrive at those points with zero phase difference between them. If the object is off boresight, however, there will be a difference in the distances between the object and the two receivers and a corresponding difference in transit time to them. The magnitude of this difference, which may be determined by measurement of the phase difference between the signals as received, provides a direct measure of the bearing angle of the object with respect to boresight.

Particularly in the sonar applications, the characteristics of the medium in which the system must operate tend to make this phase difference measurement a difficult one to accomplish with reliability and precision. Typically the received signals are buried deep in noise or interference, and reverberation and the multiplicity of alternative propagation modes or paths through the medium all tend to make very difficult the extraction of useful signal from the receiver output. Where correlation or comparison of two such signals is required, as it is for phase discrimination purposes, this difficulty is doubly compounded.

Among the various known processor types which have been proposed for this task is a particular form of cross correlator using time compression to enable correlation in real time without loss of useful signals yet with manageable complexity of processor circuitry. The time compression technique involved is commonly known by the term DELTIC, this being an acronym for Delay Line Time Compression. DELTIC processing is described in detail in many publications among which is U.S. Pat. No. 2,958,039 to Anderson.

SUMMARY OF THE INVENTION

The present invention has as its primary objective the provision of signal processors for sonar and other acoustic pulse-echo systems, utilizing DELTIC processing for deriving bearing angle information in real time and with good reliability even in the presence of reverberation and other noise. It is also an object of the invention to derive such bearing angle information using digital signal processing but with no significant loss of signal amplitude information in the course of such processing, to thus enable improved precision of bearing angle measurement and indication.

The signal processor of this invention derives bearing angle information by measurement of the phase difference of echo signals received at two spaced points, using in its processing operation also the transmitted signal of which the echo signals are reflections. The two received signals are each sampled at a common rate, A/D converted, and loaded into one of two moving time series (MTS) DELTIC processors. Transmitted signal polarity information is loaded into a stationary time series (STS) DELTIC, and the STS signal then correlated against each of the MTS signals. The two correlation signals thus generated, after further processing, control the start and stop of timing means to provide directly a measure of the phase difference of the received signals. Thresholding means are provided for establishing a threshold value which must be exceeded by one or more of the processed correlation signals, in which the received signal amplitude is preserved, in order to initiate each phase difference measurement. If desired the two correlation signals may also be combined with suitable processing for direct visual display.

BRIEF DESCRIPTION OF THE DRAWING

The foregoing and other objects, features and advantages of the invention will become more fully apparent and the invention further understood by reference to the following detailed description when read in conjunction with the accompanying drawings, wherein:

FIG. 2 illustrates representative waveforms in the apparatus of FIG. 1; and

FIG. 3 is a block diagram illustrating one implementation of certain elements of the apparatus of FIG. 1.

DESCRIPTION OF THE PREFERRED EMBODIMENT

Figure 1:
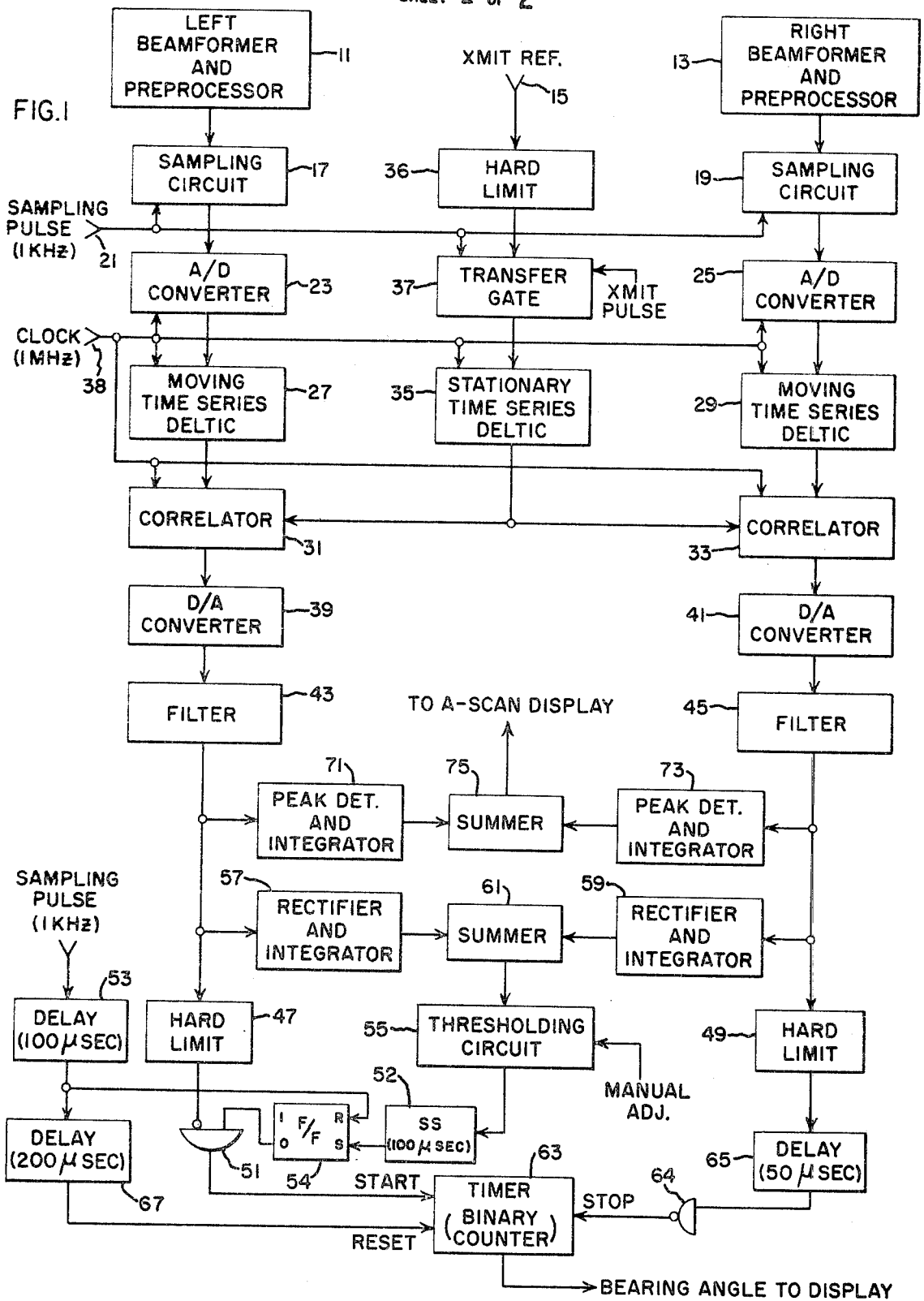
FIG. 1 is an electrical block diagram of phase discriminator apparatus in accordance with the invention shown embodied in sonar bearing angle measurement and display equipment.

With continued reference to the drawings, FIG. 1 illustrates a preferred embodiment of the pulse-echo bearing angle measurement and display apparatus of the invention. This apparatus will be described in the following with particular reference to its sonar application, but as previously indicated the invention has application also to other pulse-echo systems such, for example, as seismic exploration equipments and ultrasound systems as used in medical diagnostics and the like.

Bearing angle measurement in the system as illustrated in FIG. 1 employs three signal inputs, two being the target reflection or echo signals as received on left- and right-hand receptors 11 and 13, respectively, and the third being the transmitted signal which is inputted as at 15. Each of the receptors 11 and 13 may as indicated comprise a beamformer including an array of transducer elements together with associated circuitry for phasing the individual elements so as to form a beam and to steer the beam through a range of bearing angles. The two beamformers are conjointly controlled to steer their respective main lobes into substantial coincidence, so that reflections from a target or other object located at the particular bearing angle to which the beams then are directed will produce outputs of approximately equal amplitude from each of the receptors 11 and 13.

Unless the target is squarely on boresight, however, return signals from it will appear at the receptors 11 and 13 with a time difference, and consequently a phase difference, between them. This difference in signal phase ($\theta$) is proportional to the target bearing angle, and more particularly is defined by the relation:

$$\theta = \text{arc cos } c(t_1 - t_2)/2a$$

where "$c$" is the velocity of sound in the propagation medium, "$a$" is the effective spacing between the two receptors, and $t_1 - t_2$ is the difference in arrival times of a signal as received by the receptors 11 and 13, respectively.

Since the receptor spacing "$a$" is known, and the velocity of sound within the medium adjacent the receptors is known or ascertainable, the task at hand is the precise and real time measurement of the time difference $t_1 - t_2$. As previously noted the extraction of this time measure is often very difficult in actual sonar operating environments by virtue of the very low signal-to-noise ratios typically obtainable in such environments and the relatively poor correlation which sometimes exists between received signal waveforms even with relatively closely spaced receptors.

To obtain the desired time difference measurement, the signals as received by each of the receptors 11 and 13 may be preprocessed through such conventional signal-to-noise ratio enhancement steps as preamplification, conversion and filtering, and automatic gain control applied as desired. The signals thus preprocessed are sampled in sampling circuits 17 and 19 at a rate determined by a sampling pulse input 21. The sampling pulse rate, shown in this representative embodiment as being 1KHz, is selected to be at least sufficiently high to avoid loss of useful information from the input signal.

The sampled signals are analog-to-digital converted in A/D converters 23 and 25 which may be conventional in configuration. Conveniently these A/D converters may be arranged to quantize the analog signal inputs to eight discrete levels utilizing a conventional three-bit digital code to define the eight binary numbers required. Thus one of the three bits represents the sign or polarity of each analog input sample and the two other bits represent its amplitude, the three together defining the sample to the nearest of eight quantization levels.

After quantization the signals are time-compressed in moving time series (MTS) DELTIC processors 27 and 29, and subsequently correlated as at 31 and 33 with a time compressed reference signal which is outputted by a stationary time series (STS) DELTIC processor 35 common to both the left- and right-hand beam channels. This reference signal derives from the transmitted pulse waveform input at 15, which is hard limited as at 36 so as to retain only its polarity information in a digitalized form adapted to loading through transfer gate 37 into the STS DELTIC 35 concurrently with the transmission of each pulse by the transmitter. The operation of the time compressors and other elements just described is synchronized by a clock input as at 38, which in the particular embodiment being described may be of the 1 MHz clock frequency indicated. This clock conveniently may also be used to generate the sampling pulse input at 21, by 1000/1 frequency division in conventional manner.

The circuitry and function of the DELTIC processors will be further described later in reference in FIG. 3; suffice it to say here that upon each pulse transmission the STS DELTIC is loaded with an input representing the transmitted pulse waveform, or more accurately, with polarity information descriptive of the clipped waveform. The transmit waveform thus defined is DELTIC processed at 35 to provide a time-compressed replica of itself, which is outputted to the two correlators 31 and 33. The left- and right-hand receive beam signals are sampled, analog-to-digital converted to produce a sign bit and two amplitude bits for each such signal sample, and the samples then time-compressed in the MTS DELTIC procesosrs 27 and 29.

In the correlators 31 and 33, the sign bits in the time-compressed outputs of the MTS DELTICS 27 and 29 are correlated against the output of the STS DELTIC 35, which it will be recalled was loaded with polarity or sign information only. Each time polarity coincidence is found between an STS sign bit and the sign bit of the left- or right-hand MTS signal against which it is being correlated, the correlation signal output will reflect both the sign data and the corresponding amplitude data, thus preserving the signal amplitude information through the time compression and correlation processes as hereinafter more fully explained.

The left- and right-hand correlator output signals are reconverted to analog form by D/A converters 39 and 41, and the products filtered as at 43–45 to remove unwanted byproducts of the correlation and conversion processes. If the D/A converters do not themselves include means for down-conversion of their outputs to the desired output frequency, down-converters of suitable type may be provided for this purpose following the filters 43 and 45.

After filtering, the correlation signals are hard limited as at 47–49, and the left-hand signal applied as one input to an AND element 51, to thus provide an enabling signal to AND element 51 upon the first axis crossing of the correlation signal waveform following the peak value of the correlation function. Logic element 51 has as its other input a 100 microsecond gate pulse generated by a single-shot 52 which is triggered to output this pulse to a flip-flop 54 by an input from the thresholding circuit 55 to be described. Flip-flop 54 has as enabling input the 1KHz sampling pulse, delayed by 100 microseconds as indicated at 53. The purpose of this delay is to assure that the 100 microsecond gate as applied to AND element 51 is delayed by a time period sufficient for completion of the time compression and correlation operations which were intiated by that sampling pulse.

The thresholding circuit 55 has as its input the sum of the left- and right-hand correlation signals as full-wave rectified and integrated at 57 and 59, and added in the summer 61. Since amplitude information descriptive of the left- and right-hand beam signals is preserved through the point of their application to the rectifier and integrator circuits 57–59, the correlator outputs as summed and applied to the thresholding circuit enable precise control of the signal amplitude necessary to enable the gate 51 to start the timer operation to be described. As indicated, thresholding circuit 55 is provided with a manually adjustable reference level, to enable adjustment of the threshold level at which gate 51 may be triggered.

AND gate 51 applies its output to the START control of a timer 63 which as indicated may be in the form of a binary counter of conventional type. Timer 63 is stopped by an input from the right-hand correlator signal after inversion at 64 and delay as at 65 through a fixed time period of duration sufficient to allow a positive count to exist for targets at least through the desired range of variation from boresight. The magnitude of this delay 65, which in the particular embodiment illustrated may be 50 microseconds as indicated, may also be made variable if desired to calibrate out any bearing offset produced by unequal phase shift through the left- and right-hand signal processing channels.

The time count from timer 63 is as previously explained a direct measure of target bearing angle, and may be outputted directly to a display as indicated. Timer 63 then may be reset, as by a suitably time-delayed sampling pulse input through delay element 67, to prepare for the next bearing angle measurement.

The operation of timer 63 may perhaps best be understood by reference to FIG. 2, the upper portion of which shows timing waveforms for a boresight target, and the lower portion for a target located to the left of boresight. As shown, where the target is squarely on boresight the left- and right-hand beam signals, after delay of the right-hand signal at 65, will be effectively 180° out of phase and the timer START and STOP signals accordingly will be equally spaced along the time axis with a spacing equal to that of the delay element 65, 50 microseconds in the example being described. If, however, the target is to the left of the boresight, then the waveforms will be shifted with respect to each other as shown in the lower portion of FIG. 2, and the timer STOP signal generated by the right-hand input will be delayed with respect to the timer START signal. The timer accordingly will indicate a time period greater than the nominal value of 50 microseconds, and the departure from this nominal value provides the desired measure of target bearing angle.

If desired, the left- and right-hand correlation signals may be used to generate an additional display in the form of an A-scan presentation either alone or time shared on a common display with the bearing angle information from timer 63. To accomplish this, the two correlation signals are peak detected and integrated as at 71 and 73, and incoherently summed at 75. The output of summer 75, when displayed in an A-scan mode, is helpful to the operator in determining where to make bearing measurements particularly when signal-to-noise ratios are low.

With reference now to FIG. 3, there is shown in greater detail one possible implementation of certain of the processor elements of FIG. 1, specifically the transfer gate 19, the STS DELTIC 35, the MTS DELTIC 27 for the left-hand beam, and the correlator 31 for that samd beam. In preference to the delay lines commonly used in DELTIC processors, the time compression loops as illustrated each comprise a shift register of conventional type. Use of these shift registers rather than delay lines improves performance by eliminating delay line length adjustment and drift in delay line length due to temperature changes.

The transfer gate 19 through which the STS DELTIC 35 is loaded comprises a flip-flop 77 to which the input is the clipped transmit reference signal, a Schmitt trigger 79 to which the input is a timing pulse from the transmitter modulator or driver of duration equal to that of the transmitted pulse envelope, and a positive logic network including AND gates 81, 82 and 83, and an OR gate 85. Gate 85 applies its outputs to the STS shift register 87, which shiftS its contents one position to the right with each clock pulse input from the 1MHz clock designated here and elsewhere in FIG. 3 by the letters "CL." Data bits which have been entered and subsequently shifted the full length of the register 87 are transmitted via a flip-flop 89 to the correlator 31, and also are transmitted as a feedback through logic element 82 for recirculation in the DELTIC loop thus constituted.

In operation of the STS DELTIC just described, when the transmitter is energized to output either a single pulse or a pulse train, Schmitt trigger 79 is activated and outputs a 1 to AND gate 82, the other inputs to which include a feedback from the flip-flop 89 and the 1KHz sampling pulse signal as applied through a flip-flop 91. The operation of the logic network 81-85 with the Schmitt trigger 79 thus activated is to load the shift register 87 with a time-compressed replica of the clipped transmit waveform, such replica being assembled in the shift register by inputting an additional bit of data through flip-flop 77 once with each of the 1 KHz sampling pulses input to flip-flop 91, meanwhile recirculating the bits previously stored in the register through flip-flop 89, AND gate 83 and OR gate 85. Upon completion of the transmission, Schmitt trigger 79 reverts to its normal state as shown and the operation of logic network 81-85 then becomes such as to recirculate the stored replica indefinitely without change. It may be noted that this recirculation loop, which is completed through lead 91, includes only the shift register 87 and does not also include the flip-flop 89.

The MTS DELTIC comprises three time compression loops each including a shift register 93, one for the "sign" and one for each of the two amplitude bits, designated S, 2' and 2° respectively in FIG. 3. The three loops are identical, each comprising an input logic network 95 which loads a new bit of input information for each change in state of flip-flop 91 at the 1KHz sampling rate previously specified, and at other times recirculates the previously entered bits in the manner conventional to DELTIC processors.

It will be noted that these recirculation loops, unlike that of the STS DELTIC, include the flip-flop 95 which follows each shift register 93. The effect of this difference is to increase the recirculation time for the MTS loops by 1 microsecond, i.e., one cycle of the 1MHz clock pulse input, to thus provide for precession of the MTS with respect to the STS in accordance with the usual practice in DELTIC correlation processing.

The outputs from the moving and stationary time series DELTICS are transmitted to correlator 31 which comprises a logic network including AND elements 97 and 98, EXCLUSIVE OR elements 99-101 and an OR element 102 all connected as shown. Logic elements 97, 98 and 102 together constitute a polarity coincidence detector the operation of which is to output a 1 whenever the output of the STS DELTIC and the sign bit outputs of the MTS DELTIC are the same, i.e., both are 1's or both are 0's. In either case the OR element 102 will output a 1 to the logic elements 99, 100 and 101, and each of those elements will output its present MTS input, whether it be a 1 or a 0, directly. When polarity coincidence is not found, OR element 102 will output a 0 and each of the logic elements 99–101 then will output the inverse of its MTS input. The direct and inverse values of MTS data read out in this way through each of the correlators 31 and 33 together define the correlation function for the respective left- or right-hand beam, which function is then further processed as already explained in reference to FIG. 1.

Thus the DELTIC processor of the invention enables DELTIC time-compression and correlation while preserving amplitude information with respect to the signals as correlated, and requires only relatively simple and straightforward implementation to accomplish this purpose. The processor implementation may take any of several alternative forms, for example the DELTIC loops may utilize either delay line or shift registers as previously mentioned, and if preferred the thresholding circuit 55 could apply its output directly to the output of timer 63 rather than through the AND element 51.

Many other modifications will occur to those skilled in the art and it therefore should be understood that the appended claims are intended to cover all such modifications as fall within the true spirit and scope of the invention.

What is claimed as new and desired to be secured by Letters Patent of the United States is:

1. A pulse-echo signal processor for determining the phase difference of two received signals which include reflections of a transmitted signal, comprising:

a. means for sampling said two received signals at a common sampling rate and digitalizing each of the samples to provide first and second digital sample signals respectively describing one of said received signals both as to polarity and amplitude;

b. first and second moving time series (MTS) time compression means each including a recirculation loop and means for loading into said loop at said sampling rate the polarity and amplitude information describing one of said first and second digital sample signals, for recirculation therein as a time compressed MTS signal;

c. stationary time series (STS) time compression means including a recirculation loop and means for digitalizing polarity information from said transmitted signal and loading the polarity information at said sampling rate as a time compressed STS signal in said loop for recirculation therein, said STS time compression means having a recirculation time differing from that of said MTS means to thereby provide precession of the MTS signals with respect to the STS signal;

d. first and second correlation means each operative to compare the STS signal for polarity coincidence with one of said first and second MTS signals and operative to output a correlation signal which preserves both polarity and amplitude information describing each MTS signal for which polarity coincidence with the STS is found;

e. time measuring means responsive to the correlation signal outputted by said first correlation means to initiate a time measurement and responsive to the correlation signal outputted by said second correlation means to conclude said measurement and indicate the phase difference determination thus made; and f. thresholding circuit means responsive to the amplitude of at least one of said correlation signals to enable phase difference determinations only with respect to received signals for which said one correlation signal exceeds a threshold level.

2. A signal processor as defined in claim 1 further including means for rectifying, integrating and summing said correlation signals, and wherein said thresholding circuit means is responsive to the correlation signals thus summed.

3. A signal processor as defined in claim 1 further including delay means interposed between said second correlation means and said time measuring means to thus provide a positive time measure irrespective of the direction of phase differences of said received signals.

4. A signal processor as defined in claim 1 further including digital-to-analog conversion and limiter means interposed between each of said correlation means and said time measuring means.

5. A signal processor as defined in claim 1 further including means for peak detecting, integrating and summing said correlation signals for visual display.

* * * * *